US010629055B1

(12) United States Patent
Kelly

(10) Patent No.: US 10,629,055 B1
(45) Date of Patent: Apr. 21, 2020

(54) DIGITAL WATER INTRUSION NOTIFICATION SYSTEM

(71) Applicant: Kenneth Kelly, Estero, FL (US)

(72) Inventor: Kenneth Kelly, Estero, FL (US)

(*) Notice: Subject to any disclaimer, the term of this patent is extended or adjusted under 35 U.S.C. 154(b) by 0 days.

(21) Appl. No.: 16/044,109

(22) Filed: Jul. 24, 2018

Related U.S. Application Data

(60) Provisional application No. 62/578,359, filed on Oct. 27, 2017.

(51) Int. Cl.
| G08B 21/20 | (2006.01) |
| G08B 25/10 | (2006.01) |
| H04L 29/08 | (2006.01) |
| G08B 25/01 | (2006.01) |

(52) U.S. Cl.
CPC ........... *G08B 21/20* (2013.01); *G08B 25/016* (2013.01); *G08B 25/10* (2013.01); *H04L 67/12* (2013.01)

(58) Field of Classification Search
CPC ....... G08B 21/20; G08B 25/10; G08B 21/182
USPC .......................................................... 340/602
See application file for complete search history.

(56) References Cited

U.S. PATENT DOCUMENTS

| 4,175,207 A * | 11/1979 | Elliott ..................... C07C 65/24 562/460 |
| 5,229,750 A | 7/1993 | Welch et al. |
| 5,272,646 A * | 12/1993 | Farmer ............... G01M 3/2815 340/605 |
| 5,315,291 A | 5/1994 | Furr |
| 7,126,486 B2 * | 10/2006 | Kroll ..................... G08B 21/20 340/602 |
| 7,142,107 B2 | 11/2006 | Kates |
| 7,218,237 B2 | 5/2007 | Kates |
| 8,566,051 B2 * | 10/2013 | Gunness ............... E04D 13/006 324/444 |
| 9,476,787 B1 | 10/2016 | Westmoreland et al. |
| 9,500,555 B2 * | 11/2016 | Gunness ................. G01M 3/16 |
| 2006/0007008 A1 | 1/2006 | Kates |
| 2006/0267758 A1 | 11/2006 | Barth et al. |
| 2008/0252471 A1 * | 10/2008 | Ford ..................... G08B 21/20 340/605 |
| 2012/0296580 A1 * | 11/2012 | Barkay ................... G06F 19/00 702/51 |
| 2014/0167969 A1 | 6/2014 | Wedig et al. |

FOREIGN PATENT DOCUMENTS

KR           101289097          7/2013

* cited by examiner

*Primary Examiner* — John A Tweel, Jr.
(74) *Attorney, Agent, or Firm* — John Rizvi; John Rizvi, P.A.—The Patent Professor

(57) ABSTRACT

A digital water intrusion notification system comprising a water intrusion detection device, a digital data transmission device, and a software interface is disclosed. The digital water intrusion notification system preferably comprises a deployable moisture collection device to cover an area, a digital data transmission device to provide internal monitoring, relay to a computer system, and cellular connectivity, and a software interface to provide instant notification of alerts and automated dispatch of a service technician. Such a system can detect water intrusion in roofing applications or other large areas requiring sufficient leak detection coverage, and may be assembled in various orientations and compositions to suit the relevant application.

16 Claims, 2 Drawing Sheets

DIGITAL WATER INTRUSION NOTIFICATION SYSTEM

CROSS-REFERENCE TO RELATED APPLICATION

This application claims the benefit of U.S. Provisional Patent Application Ser. No. 62/578,359, filed Oct. 27, 2017 which is incorporated herein in its entirety.

FIELD OF THE INVENTION

The present invention relates generally to digital sensors, and more particularly, to a digital water intrusion notification system.

BACKGROUND OF THE INVENTION

Water intrusion into a home or other interior space is a known and common problem resulting in extensive damage to the affected property and financial burden on the owner of such property. The intrusion of water may result from a number of various causes including, for example, leaking or burst pipes, leaking roof panels, or blocked pipes causing backflow of water into the interior space. Because the causes of water intrusion may be so varied, there exist many different devices for in-home water intrusion detection.

One such device for water intrusion detection may be attached directly to an inlet water pipe for detecting an abnormal increase in the flow of water through the pipe. Such a device may comprise a probe for measuring water volume or velocity and a hardware or software interface for interpreting such measures. The hardware or software interface may be physically attached to the probe or may be wirelessly connected for remote viewing, may activate a warning indicator to visually notify a user of the abnormal water flow, and/or may activate a shutoff valve to stop the flow of water through the pipe. Such a design, though, is prone to false positive alerts, as the increased flow of water may be the result of an increased but normal demand for water from the pipe. Such a design also may not actually detect water intrusion as the test relies on a measure of water volume or velocity past the probe, and the leak may be upstream of the probe, resulting in a low or absent measure, or may be slow enough that it does not trigger an abnormal reading on the probe itself.

Another such device for water intrusion detection may comprise a sensor string network for detecting abnormal water volume in various interior spaces. Such a device may comprise a sonar and radar technology for detecting changes in impedance across a sensor cable and visually displaying such changes on a remote panel. By its nature such a design is limited to smaller or enclosed spaces such as tanks, sumps, or other low points where water intrusion may result in pooling of such water, and is generally not efficient to use in large or open areas.

Another such device for water intrusion detection may comprise a humidity sensor for detecting an abnormal increase in water content in an interior space. Such a device may comprise a humidity sensor and an alarm-emitting speaker or other audible notification means. Such a design may accurately detect a water leak, though may not generate an adequate response to such a leak as the user must be within audible range of the alarm to be notified of such leak. The resulting delay in responding to a water leak cause by such a notification system may result in an increase in damage caused by such water leak.

The plurality of devices and systems currently available on the market may further comprise single devices that do not include deployable moisture collection systems to cover an adequate area, and may not comprise a device that provides internal monitoring, relay to a computer system, cellular connectivity, instant notification of alerts, and automated dispatch of a service technician.

Therefore, there exists a need for a system that cures the above deficiencies of prior attempts to detect water intrusion.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments of the present disclosure, a digital water intrusion notification system is disclosed. Particularly, the system comprises a water intrusion detection device, a digital data transmission device, and a software interface. The system detects water intrusion into an interior space and will automatically notify a user of such intrusion via digital signal and software interface.

In another aspect, the water intrusion detection device comprises a water collection and/or detection material and/or system. Such a system may detect water intrusion via measurement of changes in water volume, changes in environmental conditions, or other such adequate means.

In another aspect, the water intrusion detection device comprises a device that detects moisture.

In another aspect, the digital data transmission device may send and/or receive a digital signal, such as via wireless internet or cellular data connection.

In another aspect, the digital data transmission device may incorporate a SIM card port.

In another aspect, the software interface may comprise computer programming that may receive and interpret the digital signal from the digital data transmission device, and may transmit the signal or notify an end user by adequate means.

Further, disclosed is a digital water intrusion notification system, comprising, a detection device configured for detecting water intrusion, a digital data transmission device, wherein upon the detection device detecting water intrusion, the digital data transmission device automatically sends a water intrusion alert to a remote device, wherein the detection device is configured to detect moisture, wherein the detection device covers a significant area within a roof, wherein the detection device is configured to detect at least one of liquid, humidity, and moisture, wherein the digital data transmission device is a device of at least one of a monitoring entity, repair technician, and a customer user; and wherein upon receiving a water intrusion alert at the remote device, dispatching a repair technician to a location of the detection device.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the relative position of components in relation to the geometric center of the invention. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
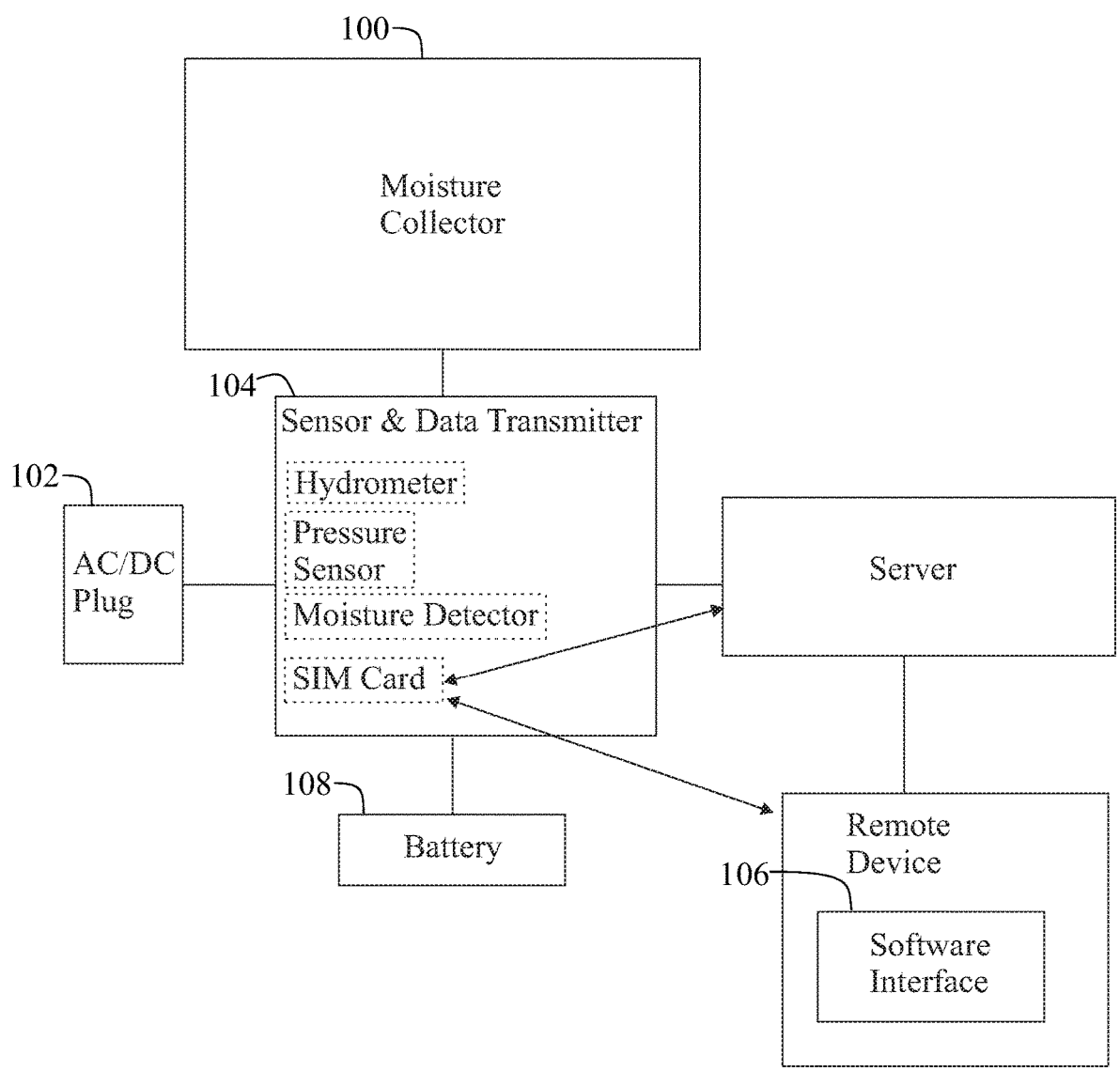
FIG. 1 schematically presents a digital water intrusion notification system comprising a water intrusion detection device, a digital data transmission device, a software interface, an AC/DC plug, and a battery, in accordance with aspects of the present disclosure.

The illustration of FIG. 1 schematically presents a digital water intrusion notification system comprising a water intrusion detection device 100, a digital data transmission device 104, and a software interface 106. The figure further presents an AC/DC plug 102 and a battery 108.

In some examples the water intrusion detection device 100 comprises any appropriate means for measuring and/or detecting abnormal levels of water within an interior space. Such measuring may be based upon analog or digital quantification of changes to the environment within the immediate proximity of the water intrusion detection device 100. Certain qualities of the environment change reliably in the presence of water, such as an increase in the humidity of an area, a change in the temperature or pressure in an area, a change in the total weight of liquids expected in an area, or the shorting of an electrical circuit between two points in an area. A water intrusion detection device 100 preferentially measures changes to the humidity of its immediate environment, and generates an analog or digital output signal that may be interpreted within the system. Further, such measuring may be performed by a device with an appropriate design for taking measurements, such as a humidity meter, probe, hydrometer, pressure sensor, detection strip, or other appropriate means.

In some examples the digital data transmission device 104 comprises any appropriate means for receiving an output signal generated by a water intrusion detection device 100, translating that output signal into a digital data packet for use by a software interface 106, and transmitting such digital data packet via digital transmission to a remote computing system 200. Such receiving of an output signal may occur by any appropriate direct or indirect means, such as by transmission through an electrical or fiber-optic cable, by short-range radio signal, by infra-red signal, or by other appropriate means. Such means of signal transmission preferably comprises a direct cable connection between a water intrusion detection device 100 and a digital data transmission device 104 to maximize system signal transmission reliability and minimize system complexity and maintenance requirements.

In some examples the digital data transmission device 104 may comprise a software or software component for translation of an output signal into a digital data packet for use by a software interface 106.

In some examples the digital data transmission device 104 may comprise a means of digital data transmission such as by wireless internet signal or cellular data signal. Such means may incorporate a plurality of digital data transmission formats simultaneously to enable cross-platform compatibility or improved signal strength. Such digital data transmission device 104 may further comprise a SIM card port for receiving a SIM card and for securely transmitting data over cellular or other wireless mobile transmission means.

In some examples the digital data transmission device 104 may comprise a means for constant digital data transmission, regular interval digital data transmission, or alert-only digital data transmission, as appropriate. For example, digital data transmission device 104 may be designed to transmit a constant signal to a software interface 106, where an alert may be triggered by the interruption or failure of such a signal, or may be designed to transmit no signal to a software interface 106, where an alert may be triggered by the transmission of a signal. A digital data transmission device 104 may preferably comprise a means for constant interval data transmission to a software interface 106, whereby a status log may be compiled with constant interval reports of a normal status and alert notifications in the event of a system fault.

Figure 2:
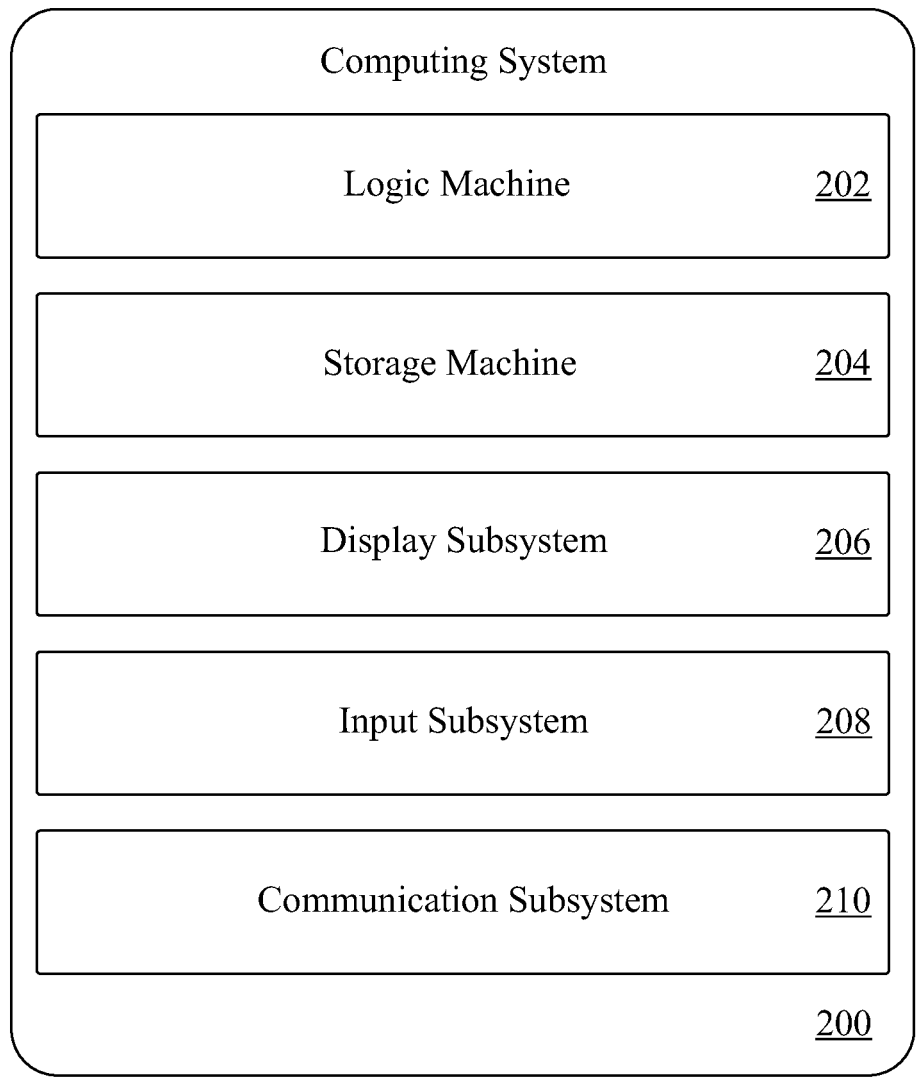
FIG. 2 schematically presents a computing system in accordance with aspects of the present invention.

In some examples the software interface 106 comprises a computing system such as computing system 200 of FIG. 2. For example, storage machine 204 may hold instructions executable by logic machine 202 to provide data output to users. Display subsystem 206 may display the various elements of data output. For example, display subsystem 206, storage machine 204, and logic machine 202 may be integrated such that data output may be compiled while being displayed on a display screen. The input subsystem 208 may receive data input from the water intrusion detection device 100 to indicate the various environmental variables being monitored. Communication subsystem 210 may allow the data output to be transmitted via an online computer network or cellular data network. The described data may be processed, provided or implemented to a user or one or more computing devices via a computer-program product such as via an application programming interface (API).

The illustration of FIG. 2 schematically shows a non-limiting exemplary embodiment of a computing system 200 that can enact the system described above. Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210. Logic machine 202 may execute machine-readable instructions via one or more physical devices. For example, the logic machine 202 may be configured to execute instructions to perform tasks for a computer program. The logic machine may include one or more processors to execute machine-readable instructions. Storage machine 204 includes one or more physical devices configured to hold or store instructions executable by the logic machine. When such methods and processes are implemented, the state of storage machine 204 may be changed to hold different data. For example, storage machine 204 may include memory devices such as various hard disk drives or CD or DVD devices. Display subsystem 206 may visually present data stored on storage machine 204. For example, display subsystem 204 may visually present data to form a graphical user interface (GUI). Input subsystem 208 may be configured to connect and receive input from devices such as a mouse, keyboard, or gaming controller. Communication subsystem 210 may be configured to enable computing system 200 to communicate with other computing devices. Communication subsystem 210 may include wired and/or wireless communication devices to facilitate networked communication.

In some examples the software interface 106 may comprise any proprietary or commercially-available program appropriate to receive, interpret, and transmit a plurality of signals used and usable by a digital water intrusion notification system. Such software interface 106 may further comprise a means for automatic notification of water intrusion to an end user. Such an end user may comprise a customer, a monitoring company, or a repair technician. Such notification to such an end user may comprise an alarm or an alert of water intrusion, or may comprise a notification or a dispatch of an end user to such a water intrusion for the purposes of repair or other appropriate intervention.

In some examples the digital water intrusion notification system further comprises an AC/DC plug 102 for supplying constant primary power to the system. Such an AC/DC plug may comprise any appropriate means of connection to a constant power source, depending on available local and regional hardware devices. For example, an AC/DC plug 102 for use in the United States may preferably comprise a 3-prong universal 120 volt adaptor for connection to a local power grid.

In some examples the digital water intrusion notification system further comprises a battery 108 for supplying backup power to the system in the event of power loss from the AC/DC plug 102. A battery 108 may comprise any appropriate means of power storage depending on available local and regional hardware devices. For example, a battery 108 may preferably comprise a battery with sufficient storage capacity to power the system for a pre-determinable number of hours in the event of power loss to the system.

In some examples the digital water intrusion notification system may be designed to provide water intrusion detection coverage over a large area of interior space, such as the interior of a roof or a building foundation. Such a system may comprise the essential elements of the system described herein, though such elements may be arranged as appropriate for installation in the specific application.

The plurality of components of the digital water intrusion notification system may be substantially constructed of any suitable solid or semi-solid materials, but typically are constructed of a resilient material or combination of materials such that the combination is resistant to compression, water damage, and crush damage as a result of everyday use or water intrusion. As an example, and without limiting the scope of the present invention, various exemplary embodiments of the plurality of components may be substantially constructed of one or more materials of plastic, metal, concrete, adhesive materials, natural products, or combinations thereof. The thickness of the material used in each component may vary as desired.

In conclusion, provided is a digital water intrusion notification system comprising a water intrusion detection device 100, a digital data transmission device 104, a software interface 106, an AC/DC plug 102, and a battery 108. Further, provided is a digital water intrusion notification system designed to provide interval monitoring of an area, relay to a computer system, cellular connectivity, instant notification to an end user, and automated dispatch of a service technician to the water intrusion site.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A digital water intrusion notification system, comprising:
    a detection device configured for detecting water intrusion; and
    a digital data transmission device,
    wherein upon the detection device detecting water intrusion, the digital data transmission device automatically sends no data to a remote device causing an alert to be triggered in the remote device; and
    wherein upon no detection of water intrusion, the digital data transmission device includes a SIM card and sends regular interval data to the remote device indicating a normal status.

2. The system of claim 1, wherein the detection device is configured to detect liquid.

3. The system of claim 1, wherein the detection device is configured to detect humidity.

4. The system of claim 1, wherein the detection device is configured to detect moisture.

5. The system of claim 1, wherein the detection device includes a hydrometer.

6. The system of claim 1, wherein the detection device includes a pressure sensor.

7. The system of claim 1, wherein the detection device includes a moisture detection strip.

8. The system of claim 1, wherein the detection device is configured to send data to the digital data transmission device via a wireless connection.

9. The system of claim 1, wherein the detection device is configured to send data to the digital data transmission device via a wired connection.

10. The system of claim 1, wherein the digital data transmission device is configured to send data to the remote device via a cellular network connection.

11. The system of claim 1, wherein the remote device is a device used by a monitoring entity.

12. The system of claim 1, wherein the remote device is a device used by a repair technician.

13. The system of claim 1, wherein the remote device is a device used by a customer user.

14. The system of claim 1, wherein the detection device covers a significant area within a roof.

15. A digital water intrusion notification system, comprising:
- a detection device configured for detecting water intrusion;
- a digital data transmission device,
- wherein upon the detection device detecting water intrusion, the digital data transmission device automatically sends no data to a remote device causing an alert to be triggered in the remote device;
- wherein the detection device is configured to detect moisture; and
- wherein the detection device covers a significant area within a roof; and
- wherein upon no detection of water intrusion, the digital data transmission device sends data constantly to the remote device indicating a normal status.

16. A digital water intrusion notification system, comprising:
- a detection device configured for detecting water intrusion;
- a digital data transmission device,
- wherein upon the detection device detecting water intrusion, the digital data transmission device automatically sends no data to a remote device causing an alert to be triggered in the remote device;
- wherein the detection device is configured to detect moisture;
- wherein the detection device covers a significant area within a roof;
- wherein the detection device is configured to detect at least one of liquid, humidity, and moisture;
- wherein the remote device a device of at least one of a monitoring entity, repair technician, and a customer user; and
- wherein upon receiving no data at the remote device, dispatching a repair technician to a location of the detection device; and
- wherein the digital data transmission device sends data intervally to the remote device indicating a normal status.

* * * * *